(12) United States Patent
Pettersson et al.

(10) Patent No.: US 8,036,452 B2
(45) Date of Patent: Oct. 11, 2011

(54) METHOD AND MEASUREMENT SYSTEM FOR CONTACTLESS COORDINATE MEASUREMENT ON AN OBJECT SURFACE

(75) Inventors: Bo Pettersson, London (GB); Knut Siercks, St. Gallen (CH); Benedikt Zebhauser, Rorschach (CH)

(73) Assignee: Leica Geosystems AG, Heerbrugg (CH)

( * ) Notice: Subject to any disclaimer, the term of this patent is extended or adjusted under 35 U.S.C. 154(b) by 1086 days.

(21) Appl. No.: 11/837,341

(22) Filed: Aug. 10, 2007

(65) Prior Publication Data
US 2009/0046895 A1 Feb. 19, 2009

(51) Int. Cl.
*G06K 9/20* (2006.01)
*G06T 15/00* (2011.01)

(52) U.S. Cl. ...................................................... 382/154
(58) Field of Classification Search .................. None
See application file for complete search history.

(56) References Cited

U.S. PATENT DOCUMENTS

| | | | |
|---|---|---|---|
| 4,969,108 A | 11/1990 | Webb | |
| 5,175,601 A * | 12/1992 | Fitts | 356/604 |
| 5,805,289 A | 9/1998 | Corby | |
| 6,073,056 A | 6/2000 | Gawronski et al. | |
| 6,445,815 B1 * | 9/2002 | Sato | 382/154 |
| 6,556,704 B1 * | 4/2003 | Chen | 382/154 |
| 7,180,607 B2 | 2/2007 | Kyle et al. | |
| 7,312,862 B2 | 12/2007 | Zumbrunn et al. | |
| 2003/0048459 A1 | 3/2003 | Gooch | |
| 2003/0202089 A1 * | 10/2003 | Alhadef et al. | 348/42 |
| 2004/0013295 A1 * | 1/2004 | Sabe et al. | 382/153 |
| 2005/0166413 A1 | 8/2005 | Crampton | |
| 2007/0118805 A1 * | 5/2007 | Kraus et al. | 715/757 |
| 2008/0123937 A1 * | 5/2008 | Arias Estrada et al. | 382/154 |
| 2010/0098327 A1 * | 4/2010 | Se et al. | 382/154 |

FOREIGN PATENT DOCUMENTS

| | | |
|---|---|---|
| DE | 44 03 901 | 8/1994 |
| EP | 0 754 930 | 1/1997 |
| FR | 2 846 413 | 4/2004 |

* cited by examiner

*Primary Examiner* — Brian Werner
(74) *Attorney, Agent, or Firm* — Maschoff Gilmore & Israelsen

(57) ABSTRACT

The invention relates to a method and a surveying system for noncontact coordinate measurement on the object surface (2) of an object (1) to be surveyed in an object coordinate system (O). With a 3D image recording unit (3), a first three-dimensional image ($P_1$) of a first area section ($S_1$) of the object surface (2) is electronically recorded in a first position ($x_1$, $y_1$, $z_1$) and first orientation ($\phi_1$, $\omega_1$, $\kappa_1$), the first three-dimensional image ($P_1$) being composed of a multiplicity of first pixels ($i_1$), with which in each case a piece of depth information is coordinated. First 3D image coordinates ($u_{1i}$, $v_{1i}$, $w_{1i}$) in an image coordinate system (B) of the 3D image recording unit (3) are coordinated with the first pixels ($i_1$). The first position ($x_1$, $y_1$, $z_1$) and first orientation ($100_1$, $\omega_1$, $\kappa_1$) of the 3D image recording unit (3) in the object coordinate system (O) are determined by a measuring apparatus (4a, 4b) coupled to the object coordinate system (O). First 3D object coordinates ($x_{1i}$, $y_{1i}$, $z_{1i}$) in the object coordinate system (O) are coordinated with the first pixels ($i_1$) from the knowledge of the first 3D image coordinates ($u_{1i}$, $v_{1i}$, $w_{1i}$) and of the first position ($x_1$, $y_1$, $z_1$) and first orientation ($\phi_1$, $\omega_1$, $\kappa_1$) of the 3D image recording unit (3).

19 Claims, 3 Drawing Sheets

Figure 1:
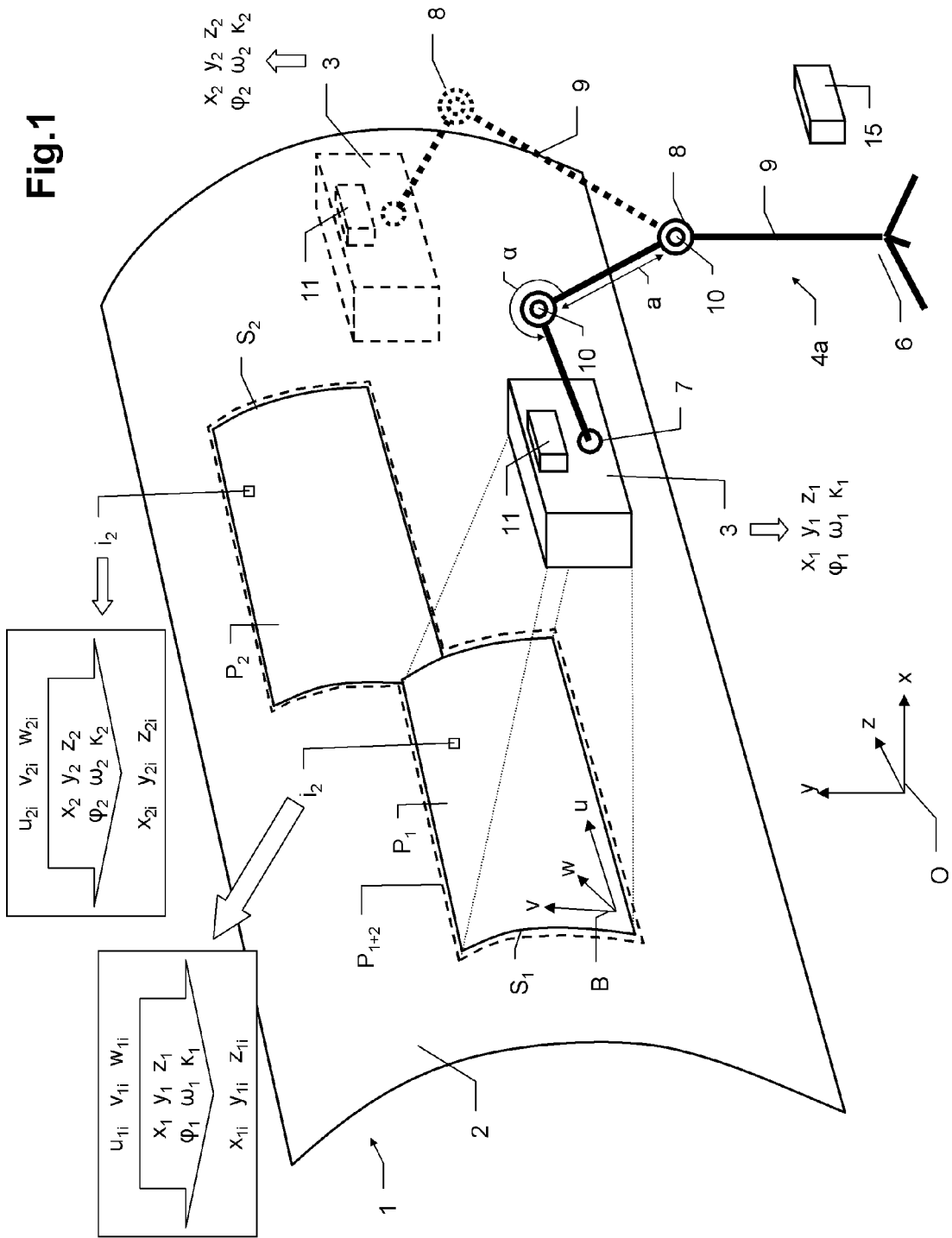

METHOD AND MEASUREMENT SYSTEM FOR CONTACTLESS COORDINATE MEASUREMENT ON AN OBJECT SURFACE

The invention relates to a method and a surveying system for noncontact coordinate measurement on the object surface of an object to be surveyed in an object coordinate system, according to the preamble of claims 1 and 13.

For the noncontact photogrammetric coordinate measurement on the surface of an object in a close range, the dimensions of the object are derived from images which reproduce the object from various perspectives, by transformation of the image data into an object coordinate system. For this purpose, the image data are processed in a data processing unit. The basis of the coordinate calculation is the determination of the camera orientations of the images involved.

As know from the prior art, it is possible to record those area sections of the object surface which are to be surveyed at different times from different perspectives by means of a single camera and then to process the two-dimensional image data in each case by means of an image processing system to give a so-called three-dimensional image. In each case depth information is coordinated with the pixels of the three-dimensional image, so that 3D image coordinates in an image coordinate system which is determined from the cameras and the perspectives thereof are coordinated with each pixel to be investigated, in particular all pixels. Different image processing methods for producing such a 3-dimensional image from a plurality of 2-dimensional images showing the same scene from different perspectives are disclosed in the prior art.

It is furthermore possible, as likewise known from the prior art, to carry out a substantially simultaneous recording with the aid of a plurality of cameras in stead of the recording of the area section from different perspectives at different times by means of one camera. This has the advantage that both a three-dimensional determination of the area section is possible without camera movement and determination of the respective camera orientations is dispensed with since the cameras can have a fixed relative orientation and distance to one another.

The prior art discloses different 3D image recording devices which are substantially composed of two or three cameras which are housed a distance apart, i.e. having a stereoscopic basis, in a common housing for recording a scene from in each case different but fixed relative perspectives. Since the recorded area section does not inevitably have characteristic image features which permit electronic processing of the images, markings can be applied to the area section. These markings can be produced by means of a structured light beam, in particular laser beam, projecting from the 3D image recording unit onto the area section, which, for example, projects an optical screen or an optical marking cross. Usually, such 3D image recording units also comprise an image processing device which derives a three-dimensional image from the plurality of images from different perspectives which are recorded substantially simultaneously.

Such 3D image recording units are, for example, the image recording systems from "CogniTens", which are known by the trade names "Optigo" and "OptiCell" and contain three cameras arranged in an equilateral triangle, and the system "Advent" from "ActiCM" with two high-resolution CCD cameras arranged side by side and a projector for projecting structured light onto the section to be recorded.

The determination of the coordinates of recorded image elements to be surveyed is effected as a rule by means of referenced markings within the image, from which markings the actual 3D coordinate measurement takes place. Here, the image coordinate system which relates to the recorded three-dimensional image and is therefore based on the 3D image recording unit is transformed into the object coordinate system within which the object to be surveyed exists and which is based, for example, on the CAD model of the object. The transformation takes place on the basis of recorded markings whose positions in the object coordinate system are known. Here, accuracies of less than 0.5 millimeter are achieved with the 3D image recording units known from the prior art.

3D scanning systems, in particular in the form of 3D laser scanners, which carry out deep scanning within a sector and produce a point cloud are furthermore known. Here, a distinction should be made between serial systems in which a laser beam scans an area line by line, parallel systems in which the scanning line is fanned out over an area and completely parallel systems, so-called RIMs or range imaging systems which simultaneously scan a multiplicity of points within a sector and thus carry out a deep recording of the sector. Common to all these systems as a rule is that the deep scanning is effected by means of at least one distance-measuring laser beam which in particular is moved over the area. In particular, such serial systems are widely used and are commercially available, for example, under the product designations "Leica HDS 6000", "Leica ScanStation 2", "Trimble GX 3D Scanner", "Zoller+Fröhlich IMAGER 5003" and "Zoller+Fröhlich IMAGER 5006".

One problem of every 3D image recording unit is that the recording region within which an image recording can be made with the required resolution is limited by the design. In the case of the three-dimensional determination of relatively large objects, the making of a plurality of individual three-dimensional recordings from different positions and orientations of the 3D image recording unit is therefore unavoidable. This multiplicity of smaller image recordings is subsequently combined by means of matching of overlapping image regions with the aid of markings within the recorded sector to give a larger three-dimensional total image. Different methods for achieving this object are disclosed in the prior art. A general problem in the case of these methods is that the individual three-dimensional images which are to be combined to give a larger image must have an overlap region. The discrete changing of the position of the 3D image recording unit from a first area section having at least one reference point to a second area section which is a distance away from the first area section and contains no reference point is not possible by means of the image-processing systems unless further images which connect the two area sections were recorded. It is therefore necessary to carry out a multiplicity of intermediate image recordings in order optically to connect the two area sections a distance apart which are to be surveyed and to permit cohesive image processing. By the recording of a multiplicity of three-dimensional images which have no direct measuring content, the entire measuring method is slowed down and memory and computational resources are consumed. Furthermore, the coordinate measurements within the image recording which are inevitably associated with small measurement errors have a drastic effect on the accuracy of measurement on combination of the multiplicity of images, in particular in the case of remote reference points.

Furthermore, measuring systems and methods in which the 3D image recording unit is supported by the head of an industrial robot or a portal coordinate-measuring machine and is adjustable are further known from the prior art. Owing to the high weight of a high-quality and high-resolution 3D image recording unit, which in some cases is more than 10 kilograms, a precise determination of the position of the 3D image recording unit with the required accuracy which matches the image-recording accuracy is not possible since this would require such a stable structure of the handling system that the field of use of the 3D image recording unit would be limited to stationary systems. For example, use in the interior of vehicle bodywork would be complicated or made impossible thereby. Owing to their low accuracy of measurement, which is considerably less than that of a precise 3D image recording unit, industrial robots are unsuitable for external referencing. Once again, portal coordinate-measuring machines are not designed for supporting heavy loads and, under high mechanical load, do not give measured results which can be used for referencing. For this reason, any measured position values which are delivered by the handling system and could provide information about the absolute and/or relative position of the 3D image recording unit cannot be used for referencing the image recordings, in particular a plurality of three-dimensional image recordings of different, non-cohesive area sections.

It is therefore an object of the invention to provide a method and an apparatus which permits noncontact, precise and rapid coordinate measurement on the object surface of an object to be surveyed in an object coordinate system without inevitable use of a multiplicity of reference markings to be determined.

This object is achieved by realizing the features of the independent claims. Features which further develop the invention in an alternative or advantageous manner are described in the dependent patent claims.

The method according to the invention is carried out with the use of a 3D image recording unit known per se for electronic recording of a three-dimensional image of an area section of an object surface. The three-dimensional image is composed of a multiplicity of pixels with which in each case a piece of depth information is coordinated. The pixels arise in particular from the vertical and horizontal resolution of the optical recording elements used, for example the CCD image sensors. Such 3D image recording units are known from the prior art, for example in the form of the image recording systems of "CogniTens" which are sold under the brand names "Optigo" and "OptiCell" and contain three cameras arranged in an equilateral triangle, as well as in the form of the system "Advent" of "ActiCM" having two high-resolution CCD cameras arranged side by side and a projector for projecting structured light onto the section to be recorded. For this reason, a more exact description will be dispensed with here.

The 3D image recording unit is present in a first position and first orientation, from which a first three-dimensional image of a first area section of the object surface to be surveyed is electronically recorded. This three-dimensional image is produced electronically, in particular by the 3D image recording unit, in particular from a plurality of individual images which are recorded by means of a plurality of cameras and map the first area section from different perspectives. The first three-dimensional image is composed of a multiplicity of pixels with which in each case a piece of depth information is coordinated.

Instead of the use of a plurality of cameras which have a stereoscopic basis, it is also possible to use a 3D scanning system, for example a suitable 3D laser scanner, as a 3D image recording unit for recording the first three-dimensional image. The 3D laser scanner scans the area section serially or in parallel, or completely parallel, as described above, with corresponding systems, from the first position and first orientation by means of a moving laser beam. In addition to the laser scanning unit, the 3D laser scanner may also have an image camera, for example a CCD camera, for two-dimensional image recording. The depth information of the pixels recorded by means of the camera is obtained by the laser distance measurement.

The first three-dimensional image is recorded and produced from a single first position and first orientation, without inevitable change of position or orientation. 3D image coordinates in an image coordinate system which relates to the 3D image recording unit and the area section recorded relative to it are coordinated with the pixels present in the three-dimensional image and to be investigated with regard to the surveying of the first area section. For example, the coordinates are composed of the horizontal and vertical position of the pixel within the three-dimensional image and the distance of the recorded pixel from a recording plane of the 3D image recording unit. The assignment is effected, for example, by the 3D image recording unit or an external data processing unit to which the data are fed.

The first position and first orientation of the 3D image recording unit in the object coordinate system within which the area section is to be surveyed and within which the object to be surveyed is fixed are determined at the time of recording of the first three-dimensional image by a measuring apparatus. This measuring apparatus is coupled to the object coordinate system. This means that the object to be surveyed and the base of the measuring apparatus relative to which the position and orientation measurement is effected are coupled to one another in the course of the measuring process, while the 3D image recording unit is not coupled with respect to the base and the object to be surveyed, owing to its mobility. For a simplified representation, the common coordinate system to which the base of the measuring apparatus and the object relate is therefore referred to as object coordinate system, even if the object is to be surveyed in another coordinate system, for example defined by a CAD model. However, the possibly different coordinate systems of the measuring apparatus and of the object have a fixed common reference and are therefore coupled or can be coupled to one another.

In a next step, first 3D object coordinates in the object coordinate system are assigned to the pixels from the knowledge of the first 3D image coordinates and the first position and first orientation of the 3D image recording unit. The assignment is effected by means of a coordinate transformation known from the prior art. Thus, the 3D image coordinates are referenced to an external coordinate system, the object coordinate system.

An advantage of the invention is in particular that, owing to the relation of the 3D image coordinates to the object coordinates in the form of an external measuring system which measures the position and orientation of the 3D image recording unit, it is possible to dispense with the use of a multiplicity of reference points within the image recording. If the 3D image recording unit is brought into a second position and second orientation for recording and surveying a second area section, the referencing of the second three-dimensional image is effected at the second position and orientation measured by the measuring system. Referencing the previously recorded images and markings present therein by means of image processing can be dispensed with.

It is possible sequentially to record two or more non-cohesive area sections on the object surface of the object without making intermediate recordings which link the second area section to the first one. As a result, the measuring method can be carried out more rapidly and more precisely. By means of a data processing unit, it is possible to link a plurality of overlapping 3D image recordings with one another and combine them to give a combined image. Owing to the external referencing of each three-dimensional image recording, this can be effected in a highly precise manner without coupling errors.

In a further development of the invention, the measuring apparatus is substantially decoupled from retaining forces which act during retention of the 3D image recording unit. This means that the measuring apparatus is not exposed to any substantial retaining forces for holding the 3D image recording unit and hence no torsional and flexural forces which arise through the weight of the 3D image recording unit act on the measuring apparatus. Consequently, the accuracy of measurement during determination of the position and orientation of the 3D image recording unit is drastically increased and may correspond to the high optical accuracy of measurement of the 3D image recording unit. Furthermore, it is possible to design the measuring apparatus to be compact and mobile. In particular, this has advantages on using the 3D image recording unit within a poorly accessible space, for example within the bodywork of a vehicle to be surveyed.

The 3D image recording unit is held, for example, by a retaining device, which substantially absorbs the retaining forces, during the image recording. This retaining device may be formed, for example, by an articulated retaining arm which is decoupled from the measuring apparatus. Alternatively, the 3D image recording unit is held by hand by means of a handle.

According to the invention, it is possible for the measuring apparatus to be in the form of an adjustable mechanical articulated 3D coordinate-measuring arm. Such articulated 3D coordinate-measuring arms are known from the prior art. Comparable systems, referred to as "articulated arm" or "portable CMM", are available from "Romer" as "Sigma" "Flex" or "Omega" and from "CimCore" as "Infinite" or "Stinger".

An articulated 3D coordinate-measuring arm is distinguished by its great flexibility, easy handling, its compact design, its low weight and the possibility of mobile use. By means of a 3D image recording unit mounted on an articulated 3D coordinate-measuring arm, it is possible to carry out three-dimensional image recordings also in poorly accessible regions, even without their being a direct line of sight to the base of the articulated 3D coordinate-measuring arm, since this can be angled. Thus, highly accurate referencing to an external coordinate system is possible even in the interior of a vehicle.

In a further alternative embodiment, the measuring apparatus is in the form of an optical laser measuring system which is coupled to the object coordinate system, in particular a laser tracking system. The position and orientation of the 3D image recording unit in the object coordinate system is determined by a noncontact method by means of the laser measuring system by indirect or direct sighting of the 3D image recording unit. A laser measuring system suitable for this purpose is, for example, the laser tracker system "T-Cam" from "Leica Geosystems", which optically determines the position and orientation of a probe holder "T-Probe" on which the 3D image recording unit can be arranged, with high precision in all six degrees of freedom. The laser tracker system "T-Cam" is referenced in the object coordinate system and can thus precisely determine the position and orientation of the 3D image recording unit. With the use of this system, too, the measuring system is decoupled from retaining forces of the 3D image recording unit. The 3D image recording unit can be held, for example, by means of an articulated retaining arm or by hand.

Figure 2:
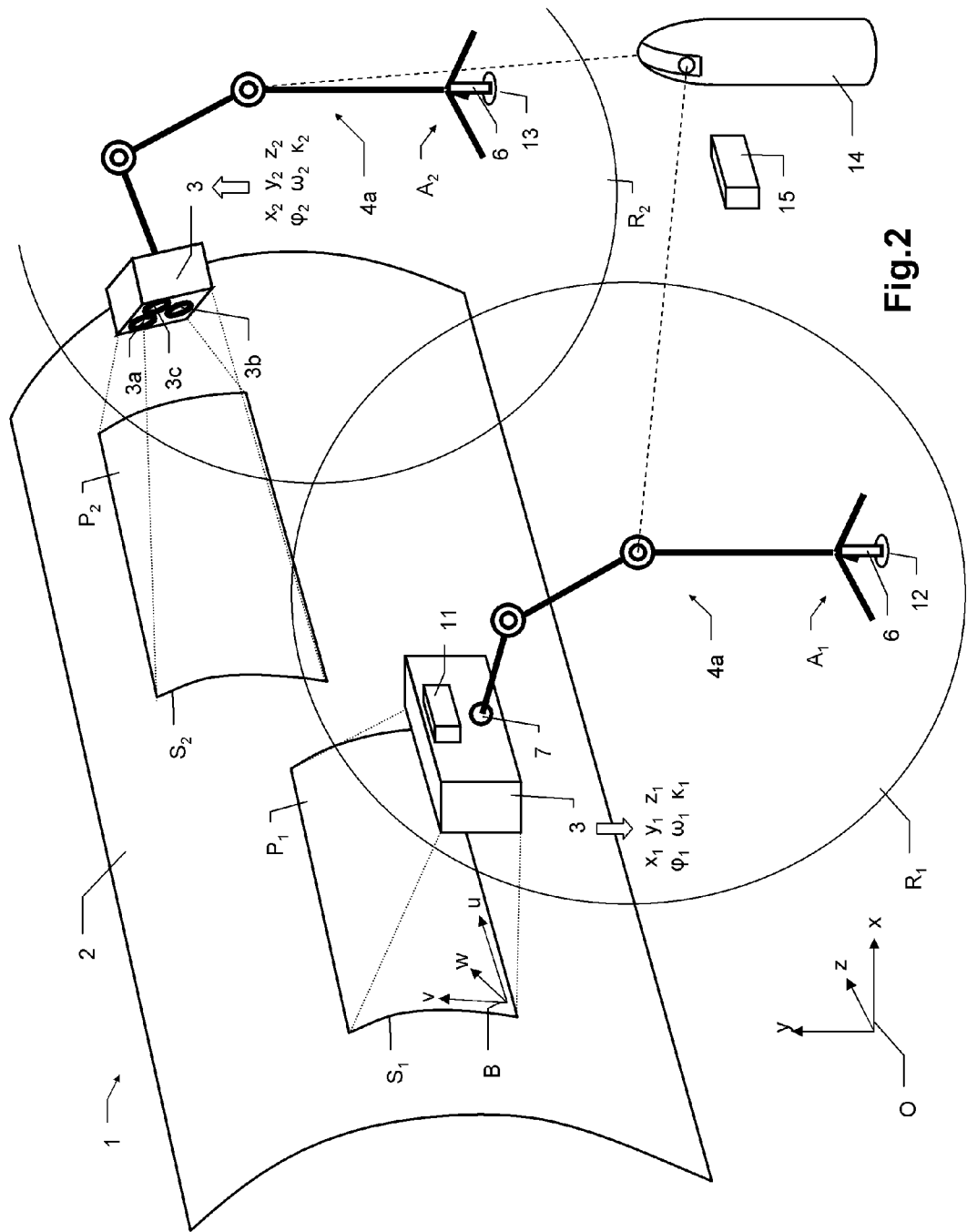
Figure 3:
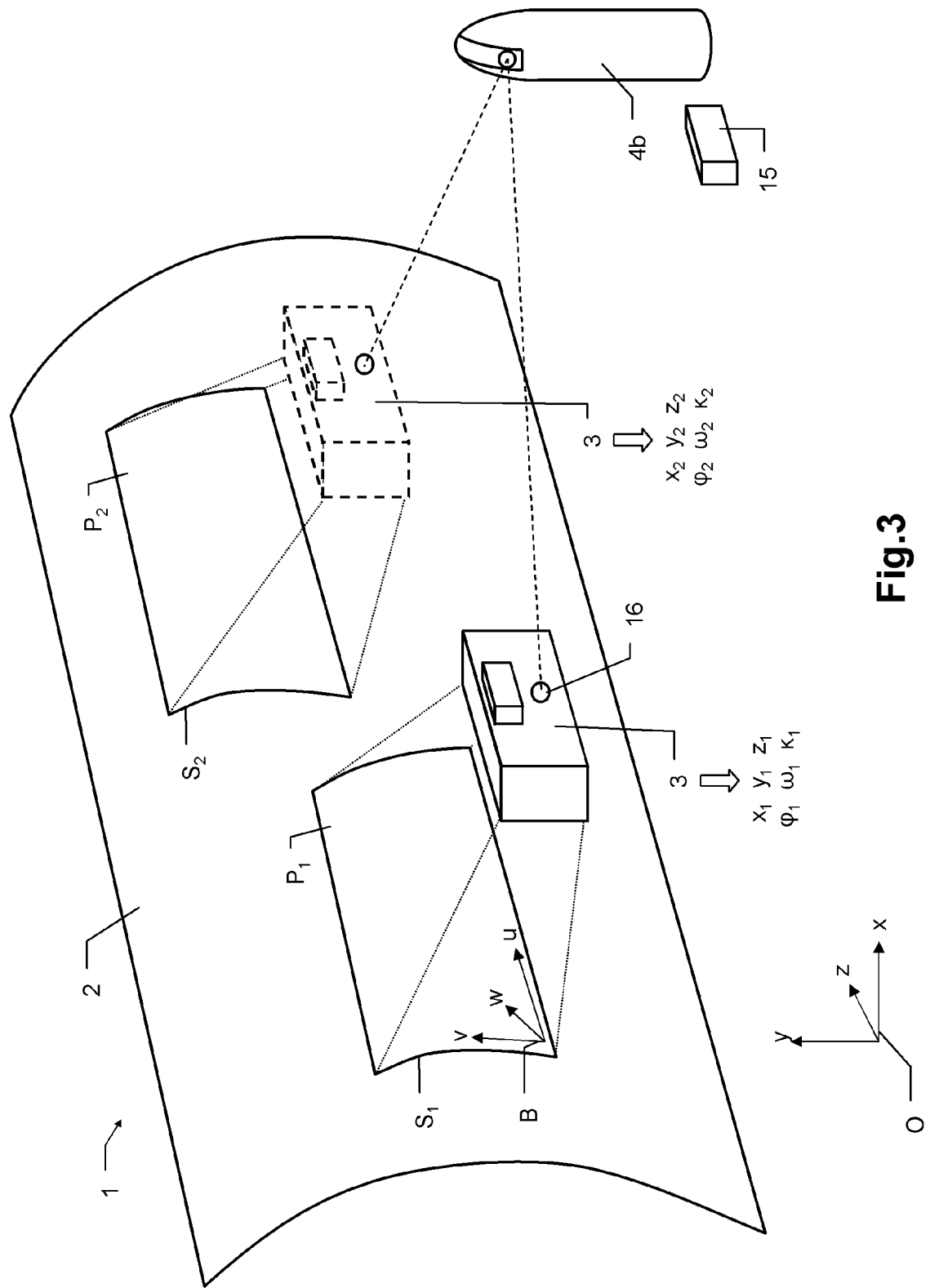

The method according to the invention and the apparatus according to the invention are described in more detail below, purely by way of example, with reference to specific working examples shown schematically in the drawings, further advantages of the invention also being discussed. Specifically:

FIG. 1 shows a surveying system and method according to the invention, comprising an articulated 3D coordinate-measuring arm as a measuring apparatus and a first and a further position and orientation of the 3D image recording unit;

FIG. 2 shows a surveying system and method according to the invention, comprising an articulated 3D coordinate-measuring arm which is positioned in a first and a second position; and FIG. 3 shows a surveying system and method according to the invention, comprising an optical laser measuring system as a measuring apparatus and a first and a further position and orientation of the 3D image recording unit.

The surveying system and surveying method illustrated in FIG. 1 for noncontact coordinate measurement on the object surface 2 of an object 1 to be surveyed in an object coordinate system O has a 3D image recording unit 3 which is formed for electronic recording of a first three-dimensional image $P_1$ of a first area section $S_1$ of the object surface 2. The 3D image recording unit 3 comprises three electronic cameras $3a$, $3b$, $3c$ (cf. FIG. 2) which, from three different recording angles, record the first area section $S_1$ for producing the three-dimensional image $P_1$. Such a system is, for example, the system "Optigo" from "CogniTens". With the 3D image recording unit 3, the first three-dimensional image $P_1$ of the first area section $S_1$ of the object surface 2 is electronically recorded in a first position $x_1$, $y_1$, $z_1$ and first orientation $\phi_1$, $\omega_1$, $\kappa_1$, the first three-dimensional image $P_1$ being composed of a multiplicity of first pixels $i_1$, with which in each case a piece of depth information is coordinated. First 3D image coordinates $u_{1i}$, $v_{1i}$, $w_{1i}$ in an image coordinate system B of the 3D image recording unit 3 are coordinated with the first pixels $i_1$. The 3D image recording unit 3 outputs these first 3D image coordinates $u_{1i}$, $v_{1i}$, $w_{1i}$ electronically.

The first position $x_1$, $y_1$, $z_1$ and first orientation $\phi_1$, $\omega_1$, $\kappa_1$, of the 3D image recording unit 3 in the object coordinate system O are determined by a measuring apparatus $4a$ coupled to the object coordinate system O. The measuring apparatus is in the form of an adjustable mechanical articulated 3D coordinate-measuring arm $4a$ and corresponds, for example, to the product "Sigma", "Flex" or "Omega" of "Romer". The articulated 3D coordinate-measuring arm $4a$ has an end 6 coupled in the object coordinate system O and an opposite moveable measuring end 7. A plurality of arm sections 9 pivotably and/or rotatably connected to one another by means of pivot joints 8 are arranged between the ends 6, 7 in such a way that the moveable measuring end 7 is freely moveable within a first spatial section $R_1$ (cf. FIG. 2). Furthermore, angle sensors 10 which are coordinated with the pivot joints 8 are provided for determining the angle position α of the respective pivot joint 8. The moveable measuring end 7 is coupled in a defined manner to the 3D image recording unit 3 in that the 3D image recording unit 3 is mounted on the measuring end 7. The first position $x_1$, $y_1$, $z_1$ and first orientation $\phi_1$, $\omega_1$, $\kappa_1$ of the 3D image recording unit 3 in the object coordinate system O is determined from the knowledge of the angle positions α of the pivot joints 8 and the fixed or flexible lengths a of the arm sections 9. The moveable measuring end 7, which is coupled to the 3D image recording unit 3, is moveable in six degrees of freedom. The articulated 3D coordinate-measuring arm $4a$ electronically outputs the determined first position $x_1$, $y_1$, $z_1$ and first orientation $\phi_1$, $\omega_1$, $\kappa_1$ of the 3D image recording unit 3.

The first 3D image coordinates $u_{1i}$, $v_{1i}$, $w_{1i}$ of the 3D image recording unit 3 and the first position $x_1$, $y_1$, $z_1$ and first orientation $\phi_1$, $\omega_1$, $\kappa_1$ of the 3D image recording unit 3 are fed from the articulated 3D coordinate-measuring arm 4a to a data processing unit 15.

The data processing unit 15 is formed in such a way that first 3D object coordinates $x_{1i}$, $y_{1i}$, $z_{1i}$ in the object coordinate system O are electronically coordinated with the first pixels $i_1$ from the knowledge of the first 3D image coordinates $u_{1i}$, $v_{1i}$, $w_{1i}$ and the first position $x_1$, $y_1$, $z_1$ and first orientation $\phi_1$, $\omega_1$, $\kappa_1$ of the 3D image recording unit 3. The data processing unit 15 outputs a signal which contains the first 3D object coordinates $x_{1i}$, $y_{1i}$, $z_{1i}$ assigned to the first pixels $i_1$. This signal can be further processed by a computer, optically displayed in the form of an image on a monitor or recorded for later further processing.

The 3D image recording unit 3 is brought from the first position $x_1$, $y_1$, $z_1$ and first orientation $\phi_1$, $\omega_1$, $\kappa_1$ into a further position $x_2$, $y_2$, $z_2$ and further orientation $\phi_2$, $\omega_2$, $\kappa_2$ within the first space $R_1$ (cf. FIG. 2), as shown by the dashed line in FIG. 1. With the 3D image recording unit 3 in the further position $x_2$, $y_2$, $z_2$ and further orientation $\phi_2$, $\omega_2$, $\kappa_2$, a further three-dimensional image $P_2$ of a further area section $S_2$ of the object surface 2 is electronically recorded, as in the first position and orientation. The further position $x_2$, $y_2$, $z_2$ and further orientation $\phi_2$, $\omega_2$, $\kappa_2$ of the 3D image recording unit 3 in the object coordinate system O is also determined in the manner described by means of the measuring apparatus 4a, namely the articulated 3D coordinate-measuring arm 4a. Further 3D object coordinates $x_{2i}$, $y_{2i}$, $z_{2i}$ in the object coordinate system O are coordinated with the further pixels $i_2$ of the further three-dimensional image $P_2$, as in the case of the first image recording, from the knowledge of the further 3D image coordinates $u_{2i}$, $v_{2i}$, $w_{2i}$ of the further three-dimensional image $P_2$ and the further position $x_2$, $y_2$, $z_2$ and further orientation $\phi_2$, $\omega_2$, $\kappa_2$ of the 3D image recording unit 3. Thus, independent and highly precise external referencing of both three-dimensional images $P_1$ and $P_2$ is effected.

As also in the case of the first image recording, the corresponding signals are fed to the data processing unit 15 which, after processing of the data, again outputs a signal which contains the second 3D object coordinates $x_{2i}$, $y_{2i}$, $z_{2i}$ coordinated with the second pixels $i_2$.

As shown in FIG. 1, the first area section $S_1$ and the further area section $S_2$ of the object surface 2 partly overlap one another. The first three-dimensional image $P_1$ having the first 3D object coordinates $x_{1i}$, $y_{1i}$, $z_{1i}$ and the further three-dimensional image $P_2$ having the further 3D object coordinates $x_{2i}$, $y_{2i}$, $z_{2i}$ are electronically combined by the data processing unit 15 to give a cohesive three-dimensional image $P_{1+2}$ and output in the form of a further signal.

The 3D image recording unit 3 is held by a retaining device 11 which substantially absorbs the retaining forces during the image recordings in the respective positions and orientations. The retaining device 11 is shown only schematically in FIG. 1 in the form of a holding point on the 3D image recording unit 3. The retaining device 11 is, for example, in the form of an articulated retaining arm which is not shown and which holds the 3D image recording unit 3 in position. Alternatively, the retaining device 11 is a handle by means of which the 3D image recording unit 3 is held in position and orientation. It should be pointed out in this context that it is less important that position and orientation remain constant over a relatively long period but rather that position and orientation are determined with high precision by the measuring apparatus at the time of image recording.

By means of the retaining device 11, the measuring apparatus 4a, i.e. the articulated 3D coordinate-measuring arm 4a, is substantially decoupled from retaining forces which act during the holding of the 3D image recording unit 3. Thus, no flexural or torsional forces act on the articulated 3D coordinate-measuring arm 4a from the 3D image recording unit 3, so that said arm can measure with high precision.

FIG. 2 illustrates the surveying method and the surveying system for recording a further area section $S_2$ which cannot be recorded from the spatial section $R_1$ within which the latitude of movement of the articulated 3D coordinate-measuring arm 4a permits a movement of the 3D image recording unit 3. Thus, a change of position of the articulated 3D coordinate-measuring arm 4a is required. The end 6 coupled in the object coordinate system O is positioned in a first position $A_1$ for recording the first three-dimensional image $P_1$ of the first area section $S_1$ by the 3D image recording unit 3 whose first position $x_1$, $y_1$, $z_1$ and first orientation $\phi_1$, $\omega_1$, $\kappa_1$ are determined within the first spatial section $R_1$. The image recording is effected as described in FIG. 1. For recording a further three-dimensional image $P_2$ of a further area section $S_2$ by the 3D image recording unit 3, the articulated 3D coordinate-measuring arm 4a with its coupled end 6 is positioned in a second position $A_2$ so that the 3D image recording unit 3 can be brought into a further position $x_2$, $y_2$, $z_2$ and further orientation $\phi_2$, $\omega_2$, $\kappa_2$ within a second spatial section $R_2$. The further position $x_2$, $y_2$, $z_2$ and further orientation $\phi_2$, $\omega_2$, $\kappa_2$ now permit a recording of the further area section $S_2$. The second image recording, too, is effected as described in FIG. 1. Owing to the possibility of designing the articulated 3D coordinate-measuring arm 4a to be compact and mobile, the change of position from the first position $A_1$ to the second position $A_2$ is possible in a simple manner.

The first position $A_1$ is determined by a first ground anchor 12 which is referenced in the object coordinate system O and in which the coupled end 6 is detachably fixed. The second position $A_2$, too, is specified by a second ground anchor 13 which is referenced in the object coordinate system O and in which the coupled end 6 is detachably fixed. Thus, it is possible to couple the articulated 3D coordinate-measuring arm 4a to the object coordinate system O by the first ground anchor 12 for determining the first position $x_1$, $y_1$, $z_1$ and first orientation $\phi_1$, $\omega_1$, $\kappa_1$ and by the second ground anchor 13 for determining the at least one further position $x_2$, $y_2$, $z_2$ and further orientation $\phi_2$, $\omega_2$, $\kappa_2$. A ground anchor 12 or 13 is generally to be understood as meaning a defined mechanical reference point, for example in the form of a mechanical receptacle and/or an optical or other reference point, for example in the form of a marking or of a certain magnetic field.

Alternatively or in addition to the use of the ground anchors 12 and 13, an optical reference laser measuring system 14 is provided. The first position $A_1$ and the second position $A_2$ are optically determined by the optical reference laser measuring system 14 which is referenced in the object coordinate system O. The articulated 3D coordinate-measuring arm 4a is coupled to the object coordinate system O by the optical reference laser measuring system 14 for determining the first position $x_1$, $y_1$, $z_1$ and first orientation $\phi_1$, $\omega_1$, $\kappa_1$ and for determining the further position $x_2$, $y_2$, $z_2$ and further orientation $\phi_2$, $\omega_2$, $\kappa_2$. A laser tracker which measures to a defined point on the articulated 3D coordinate-measuring arm 4a and thus determines and references the actual position of the coupled end 6 can be used as reference laser measuring system 14. Suitable laser trackers of this type are known from the prior art.

FIG. 3 shows a further alternative embodiment of the surveying method and surveying system from FIG. 1. Here, instead of the articulated 3D coordinate-measuring system 4a from FIG. 1, an optical laser measuring system 4b which is coupled to the object coordinate system O, in particular a laser tracking system, is used as the measuring apparatus. The first position $x_1, y_1, z_1$ and first orientation $\phi_1, \omega_1, \kappa_1$, and the position $x_2, y_2, z_2$ and further orientation $\phi_2, \omega_2, \kappa_2$ of the 3D image recording unit 3 in the object coordinate system O are determined by a noncontact method by means of the laser measuring system 4b by sighting the 3D image recording unit 3. A laser measuring system suitable for determining all six degrees of freedom is, for example, the laser tracker system "T-Cam" from "Leica Geosystems", which optically determines the position and orientation of a receiver 16 "T-Probe", which is coupled to the 3D image recording unit 3, with high precision in all six degrees of freedom. The laser tracker system "T-Cam" which forms the laser measuring system 4b is referenced in the object coordinate system O and can therefore precisely determine the position and orientation of the 3D image recording unit 3. With the use of this system, too, the measuring system 4b is decoupled from retaining forces of the 3D image recording unit 3. The 3D image recording unit 3 is held by means of the retaining device 11, for example by means of an articulated retaining arm or by hand.

The invention claimed is:

1. A method for noncontact coordinate measurement to an object surface of an object to be surveyed in an object coordinate system, comprising:
    electronically recording a first three-dimensional image of a first area section of the object surface by means of a 3D image recording unit in a first position and first orientation, the first three-dimensional image being composed of a multiplicity of first pixels, with which in each case a piece of depth information is coordinated;
    coordinating first 3D image coordinates in an image coordinate system of the 3D image recording unit with the first pixels without use of a multiplicity of reference markings being determined;
    determining the first position and first orientation of the 3D image recording unit in the object coordinate system by a measuring apparatus coupled to the object coordinate system, wherein the measuring apparatus is substantially decoupled from retaining forces which act during holding of the 3D image recording unit; and
    coordinating first 3D object coordinates in the object coordinate system with the first pixels from the knowledge of the first 3D image coordinates and of the first position and first orientation of the 3D image recording unit.

2. The method as claimed in claim 1, wherein the 3D image recording unit is brought from the first position and first orientation into at least one further position and further orientation, the method further comprising:
    electronically recording at least one further three-dimensional image of at least one further area section of the object surface with the 3D image recording unit in the further position and further orientation, wherein the further position and further orientation of the 3D image recording unit are determined in the object coordinate system by means of the measuring apparatus; and
    coordinating further 3D object coordinates in the object coordinate system with the further pixels of the further three-dimensional image from the knowledge of the further 3D image coordinates of the further three-dimensional image and the further position and further orientation of the 3D image recording unit.

3. The method as claimed in claim 2, wherein the first area section and the at least one further area section of the object surface partly overlap, and the first three-dimensional image having the first 3D object coordinates, and the at least one further three-dimensional image having the further 3D object coordinates are combined to give a cohesive three-dimensional image.

4. The method as claimed in claim 1, wherein the measuring apparatus is substantially decoupled from retaining forces which act during holding of the 3D image recording unit.

5. The method as claimed in claim 4, wherein the 3D image recording unit is held by a retaining device, which substantially absorbs the retaining forces, during image recording.

6. The method as claimed in claim 4, wherein:
    the measuring apparatus is in the form of an optical laser measuring system which is coupled to the object coordinate system, in particular a laser tracking system; and
    the first position and first orientation of the 3D image recording unit in the object coordinate system are determined in a non-contact manner by means of the laser measuring system by indirect or direct sighting of the 3D image recording unit.

7. The method as claimed in claim 4, wherein:
    the measuring apparatus is in the form of an adjustable mechanical articulated 3D coordinate-measuring arm, including:
        an end coupled in the object coordinate system and an opposite moveable measuring end;
        a plurality of arm sections arranged between the ends and pivotably and/or rotatably connected to one another by means of pivot joints in such a way that the moveable measuring end is freely moveable within a first spatial section; and
        angle sensors which are coordinated with the pivot joints for determining the angle position of the respective pivot joint;
    the moveable measuring end is coupled in a defined manner to the 3D image recording unit; and
    the first position and first orientation of the 3D image recording unit in the object coordinate system are determined from the knowledge of the angle positions of the pivot joints and of the lengths of the arm sections.

8. The method as claimed in claim 7, wherein the moveable measuring end which is coupled to the 3D image recording unit is moveable in six degrees of freedom.

9. The method as claimed in claim 7, wherein the end coupled in the object coordinate system is positioned in a first position for recording the first three-dimensional image of the first area section by the 3D image recording unit whose first position and first orientation is determined within the first spatial section and is positioned in a second position for recording at least one further three-dimensional image of at least one further area section by the 3D image recording unit in at least one further position and further orientation within a second spatial section.

10. The method as claimed in claim 9, wherein:
    the first position is determined by a first ground anchor, which is referenced in the object coordinate system and in which the coupled end is fixed;
    the second position is determined by a second ground anchor, which is referenced in the object coordinate system and in which the coupled end is fixed; and
    the articulated 3D coordinate-measuring arm is coupled to the object coordinate system by the first ground anchor for determining the first position and first orientation and by the second ground anchor for determining the at least one further position and further orientation.

11. The method as claimed in claim 9, wherein:
the first position and the second position are optically determined by an optical reference laser measuring system which is referenced in the object coordinate system; and
the articulated 3D coordinate-measuring arm is coupled to the object coordinate system by the optical reference laser measuring system for determining the first position and first orientation and for determining the at least one further position and further orientation.

12. The method as claimed in claim 1, wherein the 3D image recording unit comprises at least two electronic cameras, which record the first area section from at least two different recording angles, for producing the three-dimensional image.

13. A surveying system for noncontact coordinate measurement on the object surface of an object to be surveyed in an object coordinate system, comprising:
a 3D image recording unit formed for electronic recording of a first three-dimensional image of a first area section of the object surface, the first three-dimensional image being composed of a multiplicity of first pixels with which in each case a piece of depth information is coordinated without use of a multiplicity of reference markings being determined, and electronically outputs the first 3D image coordinates which are coordinated with the first pixels in an image coordinate system;
a measuring apparatus which is capable of being coupled to the object coordinate system, and which is formed for determining a first position and first orientation of the 3D image recording unit in the object coordinate system, wherein the measuring apparatus is substantially decoupled from retaining forces which act during holding of the 3D image recording unit; and
a data processing unit to which the first 3D image coordinates are fed from the 3D image recording unit and the first position and first orientation of the 3D image recording unit are fed from the measuring apparatus, which is formed in such a way that first 3D object coordinates in the object coordinate system are electronically coordinated with the first pixels from the knowledge of the first 3D image coordinates and of the first position and first orientation of the image recording unit, and which outputs a signal which contains the first 3D object coordinates coordinated with the first pixels.

14. The surveying system as claimed in claim 13, comprising a retaining device which substantially absorbs retaining forces, acting during holding of the 3D image recording unit, during the image recording.

15. The surveying system as claimed in claim 13, wherein the measuring apparatus is in the form of an adjustable mechanical articulated 3D coordinate-measuring arm, including:
an end which can be coupled in the object coordinate system and an opposite moveable measuring end;
a plurality of arm sections arranged between the ends and pivotably and/or rotatably connected to one another by means of pivot joints in such a way that the moveable measuring end is freely moveable within a first spatial section; and
angle sensors which are coordinated with the pivot joints for determining the angle position of the respective pivot joint, the moveable measuring end being coupled in a defined manner to the 3D image recording unit and the articulated 3D coordinate-measuring arm being formed in such a way that the first position and first orientation of the 3D image recording unit in the object coordinate system can be determined from the knowledge of the angle positions of the pivot joints and the lengths of the arm sections and are fed to the data processing unit.

16. The surveying system as claimed in claim 15, wherein the moveable measuring end which is coupled to the 3D image recording unit is moveable in six degrees of freedom.

17. The surveying system as claimed in claim 15, comprising an optical reference laser measuring system which is referenced in the object coordinate system and has a signal link to the data processing unit for coupling the articulated 3D coordinate-measuring arm to the object coordinate system.

18. The surveying system as claimed in claim 13, wherein:
the measuring apparatus is in the form of an optical laser measuring system which is coupled to the object coordinate system, in particular a laser tracking system; and
the optical laser measuring system is formed in such a way that the first position and first orientation of the 3D image recording unit in the object coordinate system can be determined by a noncontact method by means of the laser measuring system by indirect or direct sighting of the 3D image recording unit and are fed to the data processing unit.

19. The surveying system as claimed in claim 13, wherein the 3D image recording unit comprises at least two electronic cameras, which record the first area section from at least two different recording angles, for producing the three-dimensional image.

* * * * *